(No Model.)
W. MOORE.
DRILL PRESS.
No. 510,648. Patented Dec. 12, 1893.
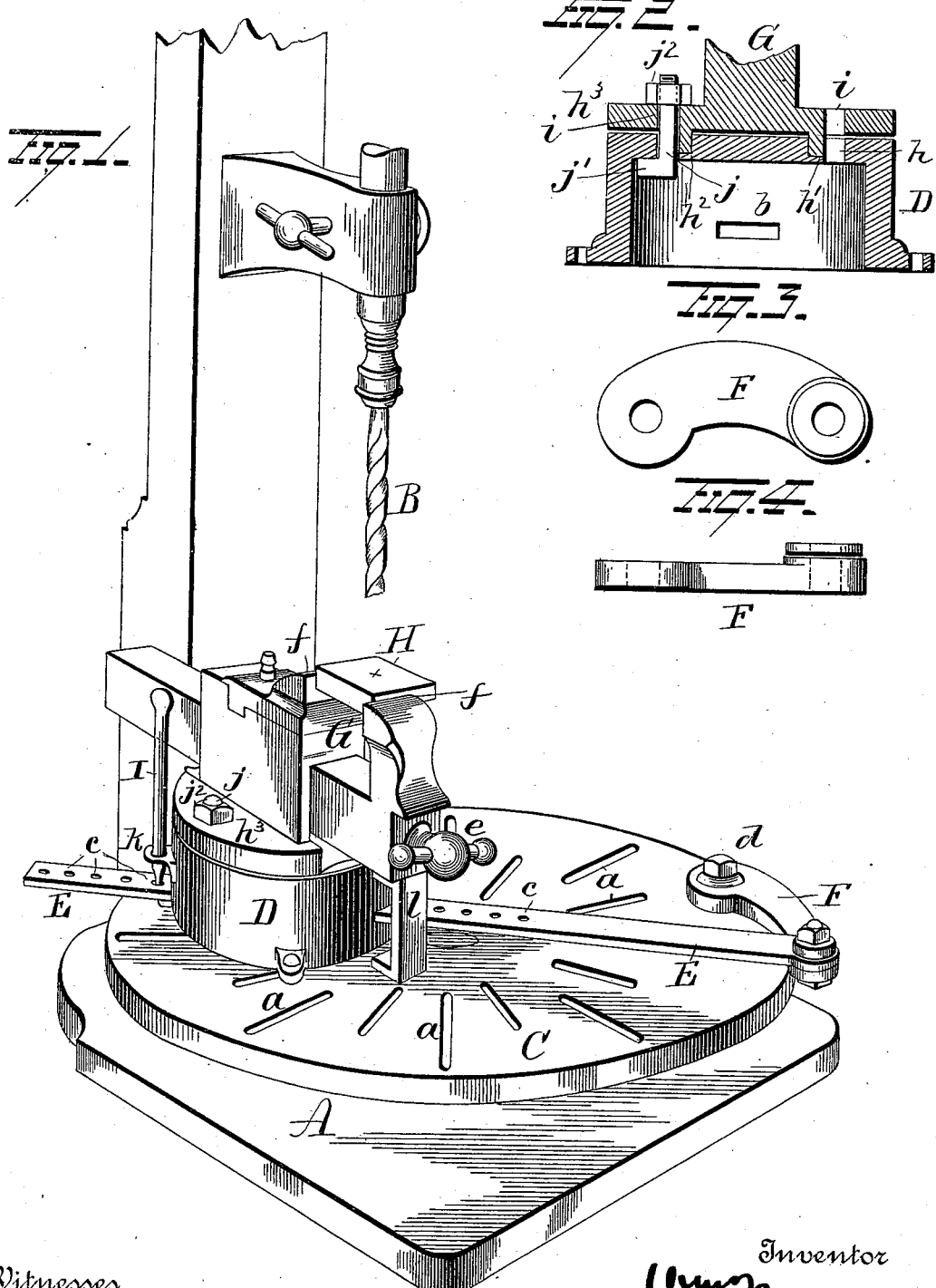
Witnesses
E. H. Nottingham
G. F. Downing
Inventor
Wm. Moore
By H. A. Suymom
Attorney

UNITED STATES PATENT OFFICE.

WILLIAM MOORE, OF KOKOMO, INDIANA.

DRILL-PRESS.

SPECIFICATION forming part of Letters Patent No. 510,648, dated December 12, 1893.

Application filed May 12, 1893. Serial No. 473,970. (No model.)

*To all whom it may concern:*

Be it known that I, WILLIAM MOORE, a resident of Kokomo, in the county of Howard and State of Indiana, have invented certain new and useful Improvements in Drill-Presses; and I do hereby declare the following to be a full, clear, and exact description of the invention, such as will enable others skilled in the art to which it appertains to make and use the same.

My invention relates to an improvement in drill presses and more particularly to devices for holding the material to be acted upon,—the object of the invention being to provide simple and efficient means whereby the work or material to be acted upon can be easily and quickly adjusted under the drill to the point where it is desired to drill the hole.

A further object is to so construct and arrange devices for holding material to be operated upon by a drill or boring machine, that the operator will be enabled to do miscellaneous work and to do a great amount of work in a given space of time.

A further object is to so construct devices for holding material to be operated upon by a drill that the material will be held firmly in position and insure the accuracy of the drilling.

A further object is to so construct work holding devices that it will be unnecessary to bolt them to the platen and at the same time so that the work will be prevented from turning with the drill and so that they can be swung around out of the way, leaving the platen unencumbered when heavier work is required to be placed thereon.

With these objects in view the invention consists in certain novel features of construction and combinations and arrangements of parts as hereinafter set forth and pointed out in the claims.

In the accompanying drawings: Figure 1 is a perspective view illustrating my improvements. Fig. 2 is a sectional view of the hollow base, showing the attachment thereto of the vise. Figs. 3 and 4 are detail views.

A represents a base, which supports a drill B of any desired construction and adapted to be operated and controlled in any preferred manner, said drill (or it may be any kind of a boring machine) being shown in the drawings merely for the purpose of illustrating the application of my improved work holding devices. On the base A a platen C is located and preferably pivotally connected thereto, although it may be stationary or swinging without affecting the operation of the holding devices. The platen C may, if desired, be provided with a number of slots $a$, as usual, although these slots are not absolutely necessary with my improvements.

Located on the platen C and adapted to have a free movement over the same when being adjusted, is a hollow base D having in its vertical wall, at diametrically opposite points, slots $b$ for the passage of a bar E having a number of perforations $c$ for a purpose which will presently appear, said bar being preferably angular in cross section. One end of the bar E is pivotally connected to the free end of a bracket or arm F, the other end of which is bolted to the platen C at a point in proximity to its periphery, by means of a bolt $d$. A vise or clamping device G is located on the hollow base D and is adapted to be adjusted by means of a screw $e$, or in any suitable manner to clamp the material H between its jaws $f, f'$, the free end of the vise being supported by a leg $l$. While said vise or clamping device might be rigidly secured to the hollow base D without seriously affecting the adjustment of the work under the drill, still I prefer to swivel said vise or holding device to the hollow base in the following manner: The top of the hollow base D is provided with slots or openings $h$, and with an annular recess $h'$ in which an annular flange $h^2$ projecting downwardly from the base $h^3$ of the vise or clamping device G rests. The base $h^3$ of the vise or clamping device G is provided with a series of perforations $i$ which align with the slots or openings $h$ in the hollow base D for the accommodation of L-shaped bolts $j$, the horizontal portion $j'$ of said bolts being adapted to bear against the under face of the top of the hollow base, while their upper ends are screw-threaded for the reception of similarly threaded nuts $j^2$. From this construction and arrangement of parts it will be seen that the vise or clamping device can be turned on the hollow base D as desired and clamped in the desired position by means of the L-shaped bolts $j$.

A rod or lever I is passed through a loop or eye k projecting from the hollow base D,—the lower end of said rod or bolt being preferably contracted and adapted to enter one of the perforations in the bar E, thus locking the hollow base D and the vise or clamping device carried thereby, in the proper position and preventing the work or material H from turning with the drill.

The operation of my improvements is as follows: The operator first swings the entire clamping arrangement out from under the drill and securely clamps the work H in the required position, and then swings it back again under the drill. By taking hold of the loose end of the bar E with one hand, and with the other the rod or lever I, the operator will be enabled to bring the point marked on the material, precisely under the point of the drill. Then the drill is brought down to its work, while the latter is being rigidly held against the thrust of the drill by the bar E being connected to the free end of the arm or bracket F. Thus it will be seen that the hollow base can be adjusted to any position so as to bring the work accurately under the drill. When it is desired to use the platen for larger, heavier work, the operator simply slides the holding arrangement on the bar E close to the connection of said bar to the arm or bracket F, and swings it around outside of the platen on the bolt d, out of the way, and when required for use again, can be quickly and easily brought back into position.

From the construction and arrangement of parts above described it will be seen that the hollow base D and the clamping devices carried thereby, can have a universal, horizontal movement over the platen C, so as to adjust the material accurately to any position desired under the point of the drill, and that the clamping devices can be readily adjusted relatively to the hollow base.

My improvements are very simple in construction, can be easily and quickly manipulated and are effectual in the performance of their functions.

Slight changes might be made in the details of construction of my invention without departing from the spirit thereof or limiting its scope, and hence I do not wish to limit myself to the precise details of construction herein set forth, but, Having fully described my invention, what I claim as new, and desire to secure by Letters Patent, is—

1. In a work holder, the combination with a platen, of a base adapted to move over the same, clamping devices carried by said base, a bar adapted to pass loosely through said base, and an arm or bracket connected to the platen and pivotally connected to said bar, substantially as set forth.

2. In a work holder, the combination with a platen, of a base adapted to move over the same, a clamping device carried by said base, a bar adapted to pass loosely through said base, means for locking said bar, and a bracket or arm connected at one end to the platen in proximity to the periphery thereof and at the other end pivotally connected to one end of said bar, substantially as set forth.

3. In a work holder, the combination with a platen, of a base adapted to move over the same, a clamping device carried by said base, a perforated bar passing loosely through said base, a loop projected from the base, a rod or lever adapted to pass through said loop and enter a perforation in said bar, and an arm or bracket connected at one end to the platen and at the other end pivotally connected to the said bar, substantially as set forth.

4. In a work holder, the combination with a platen, of a hollow base adapted to move over the same and having diametrically opposite perforations in its vertical wall, a clamping device carried by said hollow base, a bar adapted to pass loosely through the perforations in the vertical wall of the hollow base, and an arm or bracket connected at one end to the platen and at the other end pivotally connected to said bar, substantially as set forth.

5. The combination with the base of a clamping or holding device, of a bar passing loosely through said base and connected with the platen on which the said base is located, in proximity to the periphery of said platen, substantially as set forth.

6. The combination with a drilling machine and a platen, of a base located on said platen, a clamping device, a bar passing through said base and connected with the platen, a rod or lever for adjusting the said base, and a foot or leg adapted to support the free end of said clamping device, substantially as set forth.

In testimony whereof I have signed this specification in the presence of two subscribing witnesses.

WILLIAM MOORE.

Witnesses:
J. C. BLACKLIDGE,
NELLE COOPER.